(12) United States Patent
Mak et al.

(10) Patent No.: US 7,785,480 B2
(45) Date of Patent: Aug. 31, 2010

(54) SOLVENT FILTRATION SYSTEM AND METHODS

(75) Inventors: John Mak, Santa Ana, CA (US); Richard B. Nielsen, Laguna Niguel, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 812 days.

(21) Appl. No.: 10/595,527

(22) PCT Filed: Nov. 12, 2004

(86) PCT No.: PCT/US2004/037574

§ 371 (c)(1), (2), (4) Date: Apr. 10, 2007

(87) PCT Pub. No.: WO2005/049174

PCT Pub. Date: Jun. 2, 2005

(65) Prior Publication Data

US 2007/0267353 A1 Nov. 22, 2007

Related U.S. Application Data

(60) Provisional application No. 60/519,531, filed on Nov. 12, 2003.

(51) Int. Cl.
*B01D 35/16* (2006.01)
(52) U.S. Cl. .......... 210/798; 210/411; 95/279; 95/281
(58) Field of Classification Search .......... 210/333.01, 210/411, 409, 791, 798, 188; 95/279, 287, 95/281; 96/233
See application file for complete search history.

(56) References Cited

U.S. PATENT DOCUMENTS 5,505,854 A 4/1996 Glover et al.

*Primary Examiner*—Terry K Cecil
(74) *Attorney, Agent, or Firm*—Fish & Associates, PC

(57) ABSTRACT

A filter system has a first filter from which solvent is recovered in a cleaning cycle using a rinse fluid in forward flow, and from which particulates are removed using flush gas in reverse flow. At least part of the solvent and the flush gas are recycled to the system, and in still further preferred aspects, filtration of the solvent continues during the cleaning cycle via a bypass circuit through which the solvent is routed to a second filter.

14 Claims, 1 Drawing Sheet

SOLVENT FILTRATION SYSTEM AND METHODS

This application claims priority to U.S. provisional patent application with Ser. No. 60/519,531, which was filed Nov. 12, 2003, and which is incorporated by reference herein.

FIELD OF THE INVENTION

The field of the invention is relates generally to recirculating solvent filter systems.

BACKGROUND OF THE INVENTION

Flue gases contain numerous gaseous and solid contaminants. Gaseous contaminants include NOx, SOx, $H_2S$, COS, and carbonyl. These gaseous contaminants are typically removed with a re-circulating solvent system, which can include MEA, DGA, DIPA, MDEA, propylene carbonate, tributyl phosphate, normal methyl pyrrolidone, as well as various polyethylene glycol dialkyl ethers. Mixtures of these solvents are also used, including for example, mixtures of dimethyl ethers of polyethylene glycols and water. Solvents are typically recirculated, with 10% to 20% of the circulating solvent commonly being filtered in a slip stream.

Solid contaminants include calcium and magnesium carbonates or sulfates, metal sulfide, iron carbonate, iron oxide, and mill scale. Unless removed, these and other solids tend to foul columns, vessels, heat exchangers, and carbon bed filters. They can also erode the protective iron sulfide films from internal piping surfaces, thereby undesirably accelerating pipe erosion. Although solid contaminates can generally be moved via filtering, they can be saturated with hazardous gases such as $H_2S$, COS, and carbonyl. The maintenance of the filters thus requires special handling equipment and procedures. Improper handling of such contaminates can potentially endanger operating personnel and contaminate the environment.

Disposable media, including cartridges, pre-coat filters, and throw away bags, are often used to collect solid-contaminants. But the use of disposable media entails repeated media purchases and potentially costly installation. Moreover, replacement of filter cartridges and other disposable media often requires special procedures due to the presence of hazardous gases in the filtered materials. In addition, disposable media are themselves waste products, and pose their own waste disposal issues.

In an attempt to mitigate the problems associated with the use of disposable filter media, some petroleum refiners and chemical processors are currently switching to cleanable media filters. Although contemporary clean-in-place filters are capable of removing solids and particles from a solvent, and although the cleaning process can be automated to some extent to avoid the hazards and costs associated with the manual replacement of filter elements, the contemporary backwashing process in such systems also tends to undesirably remove valuable solvents from the system. While the loss of such solvents during the backwashing operation can be acceptable for some small plants, it becomes very costly and economically prohibitive for larger plants, especially for expensive solvents. Moreover, currently known systems often liberate considerable quantities of displacement vapors into the atmosphere where a gas backwash is employed.

Thus, there is still a need to provide improved filter systems and methods, where the undesirable loss of solvent is substantially mitigated, and wherein displacement vapors remain contained with in the system.

SUMMARY OF THE INVENTION

The present invention provides improved solvent based filtration systems in which loss of solvent and venting of displacement vapors into the environment are minimized, or even entirely eliminated. Implementations of the invention are contemplated to be particularly useful in larger refining facilities and in gasification plants, and even smaller facilities that utilize expensive solvents.

According to one aspect of the present invention, a particulate filter system comprises a prefilter and a main filter that receives fluid from the prefilter, wherein solvent and displacement vapors are recovered from the prefilter cleaning operation such that at least a portion of the solvent can be reused and at least a portion of the displacement vapors are recycled to the system. Most preferably, the prefilter is suitable to withstand relatively differential pressures (e.g., etched or sintered metal prefilter)

The inventors contemplate various optional equipment, including an electrostatic precipitator to conglomerate submicron particles, and a differential pressure sensor is coupled to sense a differential pressure across the etched prefilter. The sensor can be used to trigger operation of a bypass conduit that facilitates fluid flow around the etched prefilter. Other optional systems provide a rinse fluid to the etched prefilter to remove solvent, and a gas backwash system to remove particles.

Consequently, a method of operating a solvent filtration system includes a step in which a prefilter is rinsed with a wash fluid to remove at least a portion of solvent from the prefilter. In another step, particulate material is removed from the prefilter using a gas backwash. The particulate material can be further concentrated for disposal, or recycled back the process for destruction. In such methods, the solvent from the prefilter is recycled back to the main solvent while the gas used for the backwash is recycled to the rinsing cycle.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
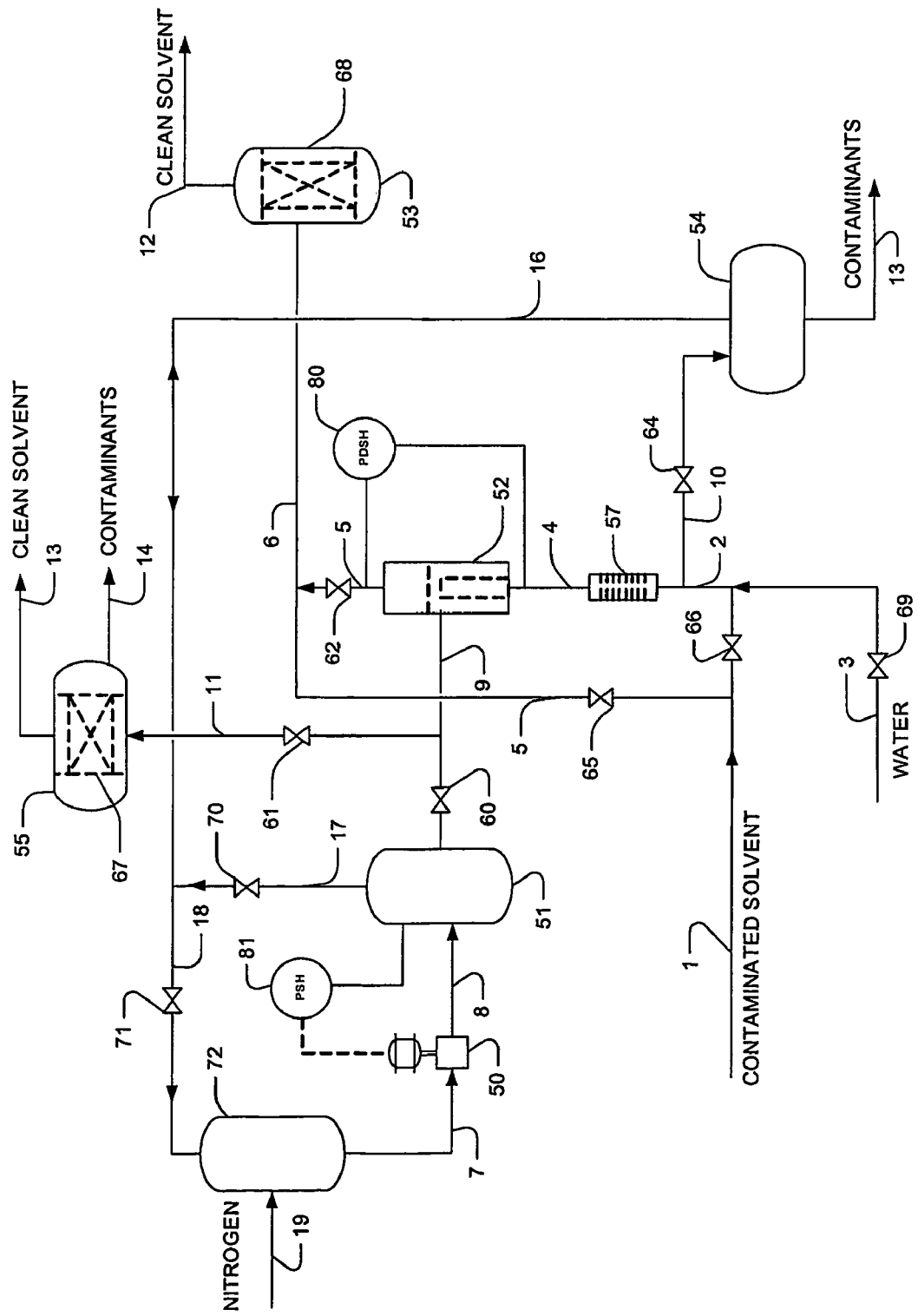
FIG. 1 is an exemplary schematic of a solvent filtering system according to the inventive subject matter.

FIG. 1 depicts an exemplary filtration system comprising a prefilter 52, a main filter 53, a fluid source 3 that provides the fluid to purge solvent from the prefilter 52 during prefilter regeneration, a gas source 51 that provides the gas to purge particulates from the prefilter 52, and respective associated lines and valves to provide recycling circuits for the solvent, the fluid, and the gas. Together, these units are designed to remove particulates (e.g., nickel carbonyl, iron sulfides, nickel sulfide, and other corrosion products) and contaminants from a circulating solvent while preventing loss and/or emission of the solvent, fluid, and/or gas.

In filtering operation a portion of contaminated solvent is routed via line 1, valve 66, and line 2 to the prefilter 52 (optionally via electrostatic precipitator 57 and line 4), while valve 65 remains closed at that time. Partially filtered solvent stream 5 exits the prefilter 52 and is routed via valve 62 and line 6 to the main filter 53 (e.g., with cartridge 68). Each of the filters should be formed of materials that are compatible with the contaminants and solvents used, and especially solvents suitable for scrubbing or otherwise purifying gases. Typical solvents include monoethanolamine (MEA), diethanolamine (DEA), diglycolamine (DGA), diisopropylamine DIPA), methyldiethanolamine (MDEA), triethylene glycol (TEG), enhanced tertiary amines, propylene carbonate, tributyl phosphate, normal methyl pyrolidone (NMP), polyethylene glycol dialkyl ethers, and mixtures of diimethyl ethers of polyethylene glycols and water. Consequently, suitable materials for the filters include steel, stainless steel, alloy metals, high strength carbon, ceramic membranes, and/or fiberglass.

It should be noted that although only single examples of each of the prefilter and main filter are shown in FIG. 1, the individual filters shown are representative of single or multiple such filters. Multiple instances of a given filter can be in series with one another, in parallel with one another, or in any desired combination of series and parallel with one another. For example, where main filters are placed in series with one another, then they can advantageously be arranged such that upstream filters provide more coarse filtering and such that downstream filters provide more fine filtering. On the other hand, where the main filters are placed in parallel with one another, then the servicing of individual filters is generally made more efficient by allowing one or more of the main filters to remain in service while one or more other main filters are off-line and being serviced.

Prefilter

It is generally preferred that the prefilter is configured such that fluid and/or a gas can pass through the prefilter in both directions without dislodging or eroding filter material into the fluid and/or gas. Moreover, and especially where the particulates are removed from the prefilter using a gas, it is preferred that the prefilter can withstand relatively high differential pressures (e.g., more than 10 psi, typically more than 25 psi, and most typically more than 50 psi). Therefore, in at least some of the preferred configurations, the prefilter comprise a stacked assembly of etched or sintered plate elements. In such prefilters, it is further preferred that the stacked filter discs are assembled without welding or brazing. However, depending on the differential pressures and other desired filter parameters, it should be recognized that numerous filter types other than those with etched or sintered plate elements or ceramic membrane are also appropriate.

It should be recognized that the prefilter may filter particulates of varying size, and a specific particulate size will predominantly depend on the particular solvent and process in which the solvent is employed. However, it is generally preferred that the prefilter-removes particles having an average largest dimension of about 1 micron and larger. Thus, in most processes, contemplated prefilters remove a majority of the solids or particulate matter from the solvent passing through. Typically at least 80%, more typically at least 90%, and most typically at least approximately 99% of particles having a size of at least one micron are removed using the prefilters. Therefore, in most applications the filters will remove micron-sized and larger particulates from approximately 5,000 ppm (parts per million) down to 100 ppm, 50 ppm, 20 ppm, or even less.

Main Filter

The main filter is preferably a cartridge filter and configured to remove particles from the solvent, wherein the particles are micron-sized, and more preferably sub-micron sized. Typically, and especially where the main filter is downstream of the prefilter, the main filter will remove sub-micron particles from about 20 ppm to 100 ppm (or even higher) to about 5-10 ppm, or even lower. There are numerous cartridge filters or membrane filtration system, known in the art, and all of them are deemed suitable for use herein. However, it should be appreciated that filter types other than cartridge filters are also appropriate, and the choice of a particular type of a filter will depend on the physical and chemical properties of the particular solvent, particulate matter and their size distribution, and economic considerations.

It should be noted that the fine filtration or polishing operation provided by the main filter helps ensure that the solvent is maintained at a desirable quality, which is typically not realized by the use of currently known filtration systems, especially in petroleum refinery or chemical plants. This higher quality both enhances the effectiveness of the solvent in the process for which it is being utilized, and facilitates the use of a reduced amount of slip stream filtration (e.g., from 10-20% of the circulating solvent to about 5-15%, more typically 5-10%, and most typically 2-10%).

As those skilled in the art will appreciate, inadequately cleaned filters (either prefilters or main filters) are less effective because the presence of particulates entrapped thereby reduces flow through the filter, thus limiting the quantity of fluid that can be filtered thereby, and/or increasing the backpressure. Further, inadequately cleaned filters are subject to actuating bypasses which allow unfiltered fluid to pass. Such bypasses can be either intentionally built into the filter, be constructed separately from the Filter, or undesirably be caused to form within the filter by an increased pressure differential across the filter caused by plugging of the filter (wherein the bypass is caused to form due to rupturing of the filter media).

Normal Filtering Operation

During the normal filtration operation, a stream of contaminated solvent flows through conduit 1, and thence through valve 66 and one or more prefilters 52. The prefilters 52 can be arranged in any suitable manner, including series, parallel, and any combination of series and parallel. If prefilters are placed in series with one another, then they can advantageously be arranged such that upstream prefilters provide coarser filtering and the downstream prefilters provide finer filtering. If prefilters are placed in parallel with one another, then the servicing of individual prefilters is generally made more efficient by allowing one or more prefilters to remain in service while one or more other prefilters is off-line and being serviced. Optionally, for the aggregation of ultrafine particles, such as particles having a size of less than approximately 1 micron, an electrostatic precipitator 57 is installed upstream with respect to the prefilter 52. Pre-filtered solvent is then further filtered in main filter 53 to yield purified solvent stream 12.

Slipstream Flow

Solvent entering the prefilter 52 is typically contaminated with particulate content, most commonly in the range of 2,000 ppm to 5,000 ppm (or even higher), and is fed to the prefilter 52 as a slipstream of the solvent stream flowing in a process, such as an acid gas removal process in petroleum refining or chemical processing. The fluid flowing though conduit 1 is typically approximately 1% to 20%, more typically 2% to 15%, and most typically 5% to 10% of the total solvent circulation. However, it should be noted that in less preferred aspects significantly higher quantities of the solvent stream may also be used. Thus, it should be recognized that up to 100% of the entire solvent circulation can be filtered, if desired.

It should further be appreciated that the configuration according to the inventive subject matter reduces the required amount of slipstream solvent at least 10%, more typically at least 25%, and most typically at least 50% over conventional systems, which typically require approximately 10% to 20% slipstream filtration. Among other reasons, this reduction is facilitated by the more efficient filtering affording by the filtering system of the present invention which results, at least in part, from the more effective prefilter cleaning processes utilized therein. As those skilled in the art will appreciate, the ability to provide adequate filtering while processing a reduced amount of the solvent is generally desirable, since it typically reduces the total amount of solvent required to operate the petroleum refining, chemical processing, or other system and thus reduces operational costs. Reducing the amount of solvent required by a system is particularly desirable when the solvent is expensive and/or hazardous.

Prefilter Cleaning

Differential pressure sensor 80 measures the pressure differential across the prefilter 52, and with that provides information to the system or operator when the prefilter requires cleaning. For example, filter cleaning is indicated when the differential reaches a predetermined threshold, such as 25-50 psi. Most preferably, prefilter cleaning comprises two distinct stages: a first stage in which solvent trapped inside the prefilter is recovered using a forward flowing liquid rinse system (thus preserving filtered solvent), and a second stage in which undesirable solids are removed from the prefilter utilizing a reverse flow of a gas or liquid (backwash). Suitable gases and liquids are preferably inert to the equipment and solvent, and especially preferred gases comprise nitrogen.

The first stage preferably, but not necessarily, uses a solvent other than the circulated solvent to remove in a forward flow (i.e., flow in the same direction as solvent flows under filtration conditions) to push out filtered solvent from the prefilter. Typically, the solvent is at least partially miscible with the circulating solvent, and most is preferably water. However, it should be recognized that alternative solvents and solvent mixtures are also deemed suitable. For example, where the forward flow solvent is poorly miscible or immiscible with the circulating solvent, recovery of the forward flow solvent may be facilitated by a phase separator. Alternatives, where the circulating solvent is miscible, distillation or other separation (e.g., molecular sieves) may be employed to recover the filtered solvent for use in circulation.

With further reference to FIG. 1, the solvent (here: water) is provided via line 3 and valve 69 to prefilter 52. In this forward flow mode, valves 60, 62, 64, and 66 are closed, while valve 61 is opened. The solvent and solvent mixture thus proceeds via lines 9 and 11 to auxiliary filter or settling tank 55, which typically includes an electrostatic precipitator or other separator 67 that separates the fine particulates (which typically have a diameter of 5 to 10 microns) from the diluted solvent. The so separated particulates leave the auxiliary filter 55 via line 14, whereas the filtered and/or diluted solvent leaves via line 13. During this stage of filter cleaning, the prefilter bypass valve 65 is opened, which causes the slipstream solvent to be diverted through lines 5 and 6 to the main filter 53. The so diverted solvent is preferably filtered using an optional second prefilter disposed along conduit 5. This allows normal filtering to continue concurrently with filter cleaning. Of course, the second prefilter is optional. Thus, conduit 5 can be either a filtered or an unfiltered bypass.

It is important to appreciate that the waste from the tank 55 can be safely disposed because it is relatively free of hazardous components. Separator 67 also produces a clean solvent stream, which exits the auxiliary filter 55 via conduit 13 and which is returned to the process. Thus, the present invention ensures the quality of the recycled solvent. The above-described rinsing step can advantageously remove approximately 99% of the solvent trapped within the prefilter.

The second stage preferably uses a gas (and less preferably a liquid) in a reverse flow (i.e., flow in the opposite direction as solvent flows under filtration conditions) to push out the particulate matter (and residual forward flow solvent where present) from the prefilter. In most cases, a preferred gas includes nitrogen or other inert gas, however, alternative gases may also include carbon dioxide, which may be in any phase (including critical phase). Typically, the gas is recirculated to provide an emission free circuit and the particulates are separated from the gas prior to re-use.

With reference to FIG. 1, the gas (here: nitrogen) is provided from surge drum 51 via valve 60 and line 9. In this reverse flow mode, the slipstream solvent through line 1, valve 65, and lines 5 and 6 to the main filter is maintained, while the water flow is stopped by closing valve 69, and 61. The nitrogen dislodges particulates in the prefilter 52 and the gas is routed together with the particulates through lines 4 and 10 and valve 64 to waste tank 54, in which the particulates settle and are removed via line 13, while the gas is recycled from the waste tank 54 via line 16 and valve 71. By performing this cleaning process using nitrogen backwash, the need to open the prefilter to discard disposable media is avoided and the undesirable release of hazardous material into the environment is mitigated.

During the nitrogen backwash operation, valves 60, 64, and 71 are open and all other valves shown in FIG. 1 are typically closed. When the washing step is completed, as indicated by a reduced pressure differential across the prefilter 52, valve 61 is closed to prevent pressurized nitrogen from flowing via conduit 11 into the tank 55 rather than the prefilter 52. At that point valve 60 is opened to introduce pressurized nitrogen through conduit 9 to the prefilter 52.

Nitrogen is preferably supplied at a pressure of approximately 50 to 100 psi using surge drum 51. The high pressure nitrogen dislodges filtrate from the prefilter 52, which is subsequently removed via conduit 10 and open valve 64 to waste tank 54. The solid sludge is removed from the system as a stream through conduit 13. The sludge is preferably removed from the waste tank 54 by closing valves 71 and 64, and then opening valve 70 to pressurize the waste tank 54 via conduits 16 and 17. Alternatively, the sludge can be removed from the waste tank 54 by gravity feed, pumping, or any other desired method.

The solid sludge contains a reduced amount of solvent, such that the solid sludge can safely be removed from the system. The operation of sludge removal from the waste tank 54 is preferably based upon a timer sequence that can be adjusted to optimize cleaning results. Alternatively, a sensor can be used to determine the amount of sludge contained within the waste tank 54 and to initiate removal of the sludge.

Optionally, the amount of solvent in the filtrate or sludge removed from the system can be automatically monitored and the operational parameters of the filter system automatically adjusted, to minimize the amount of solvent removed along with the sludge. For example, if the amount of solvent removed along with the sludge is in excess of a predetermined quantity, then additional rinsing can be performed during the next filter cleaning cycle. In the manner, the parameters can be dynamically adjusted to enhance performance.

During the backwashing operation, displacement vapors from the waste tank 54 are preferably recycled through conduits 16 and 18 via valve 71 to the low pressure nitrogen tank 72 (typically less than 50 psi), to substantially eliminate undesirable emissions. Make up nitrogen is preferably supplied from an external source to the tank 72 via conduit 19, to maintain the necessary pressure and nitrogen inventory.

After the prefilter 52 has been cleaned, normal filtering operation resumes. Nitrogen valve 60 is closed. The first filter inlet valve 66 is opened. The bypass valve 65 is optionally opened. At least a portion of the solvent is thus rerouted to the prefilter 52 and subsequently to the main filter 53, such that the normal filtration cycle is facilitated.

During the filtration process, low pressure nitrogen, typically from an offsite facility, is provided to tank 72 via conduit

19. The nitrogen flows from tank 72 to compressor 50 via conduit 7 and is compressed by compressor 50 and then supplied via conduit 8 to the surge drum 51, until the pressure switch in the surge drum reaches approximately 70 to 100 psi. When the desired pressure is achieved within the surge drum 51, as sensed by pressure switch 81, the compressor 50 is stopped and the nitrogen surge drum 51 is then ready for the next cleaning cycle.

The entire backwash operation can advantageously be performed under an inert and safe nitrogen environment. In that environment, substantially all of the displacement vapors that occur during the backwash process are recycled back into the process, thus resulting in little or no polluting emissions to the environment.

Automatic Operation

The various steps described above can all be performed automatically, or at least semi-automatically, using cleaning logic responsive to changes in differential pressure across the prefilter. That is, as solids built up on the media of the prefilter, the differential pressure across the prefilter increases. When the differential pressure reaches a preset level, the automatic filter cleaning system automatically initiates the cleaning process, to effect the water rinse operation and the gas backwash operation. The logic can be implemented in any suitable manner, including a general purpose microprocessor, such as a personal computer, or a dedicated microprocessor or microcontroller. As a further alternative, automatic control can be triggered with a timer according to some fixed schedule. Still further, the logic can be responsive to one or more chemical analysis parameters such as particulate counts or mass spectrometer measurements, or any other parameters or combinations of parameters.

The differential pressure, time associated with the water rinse operation, time associated with the pressurized fluid backwash operation, and/or any other filtering process parameters can be varied as needed. For example, these parameters can be varied according to automatically made or manual measurements of the purity of the filtered output of the filter system, the amount of solvent contained in the sludge or filtered cake, the amount or composition of particulates contained within the filtered or unfiltered solvent and/or any other measurements or parameters.

Thus, automatic operation can dynamically and continuously adjust to process dynamics, to mitigate undesirable process problems and the consequent loss of valuable solvent and/or the consequent release of hazardous material.

Thus, specific embodiments and applications of filter system have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a nonexclusive manner, indicating that the referenced elements, components, or steps can be present, or utilized, or combined with other elements, components, or steps that are not expressly referenced.

What is claimed is:

1. A plant comprising:
    a first filter configured to receive a solvent to form a pre-filtered solvent, and a second filter fluidly coupled to the first filter and configured to receive the pre-filtered solvent from the first filter;
    a first circuit configured to provide a rinse fluid in a forward flow to the prefilter to thereby displace at least part of the pre-filtered solvent from the first filter to a first receiving tank;
    a second circuit configured to provide a flush gas in a reverse flow to the prefilter to thereby displace at least a portion of solids from the first filter to a second receiving tank; and
    wherein at least part of the pre-filtered solvent from the first receiving tank and at least part of the flush gas from the second receiving tank and are recycled to the plant.

2. The plant of claim 1 further comprising a bypass circuit that is configured to route the solvent to the second filter.

3. The plant of claim 2 wherein the bypass circuit that is configured to route the solvent to the second filter when the first filter receives at least one of the rinse fluid and the flush gas.

4. The plant of claim 1 further comprising a differential pressure sensor coupled to the first filter that measures a pressure difference across the first filter.

5. The plant of claim 1 wherein the first filter is configured to withstand differential pressure of at least 25 psi.

6. The plant of claim 1 wherein the first filter comprises an etched filter element or a sintered filter element, and wherein the second filter comprises a cartridge filter.

7. The plant of claim 1 wherein the solvent is selected from the group consisting of monoethanolamine, diethanolamine, diglycolamine, diisopropylamine, triethylene glycol, methyldiethanolamine, an enhanced tertiary amine, propylene carbonate, a polyethylene glycol dialkyl ether, tributyl phosphate, normal methyl pyrolidone, and a mixture of dimethyl ethers of polyethylene glycols and water.

8. A method of operating a plant, comprising:
    removing at least part of a pre-filtered solvent from a first filter using a rinse fluid in forward flow;
    removing particulates from the first filter using a flush gas in reverse flow; and
    recycling at least part of the pre-filtered solvent and the flush gas to the plant after the pre-filtered solvent and the flush gas are removed from the first filter.

9. The method of claim 8 further comprising a step of filtering at least one of the solvent and the pre-filtered solvent in a second filter.

10. The method of claim 9 wherein the solvent is provided to the second filter via a bypass circuit, and wherein the solvent is filtered in the second filter when at least one of the pre-filtered solvent and the particulates are removed from the first filter.

11. The method of claim 8 further comprising a step of measuring a pressure difference across the first filter, and initiating the step of removing at least part of a pre-filtered solvent in response to a predetermined pressure differential.

12. The method of claim 8 wherein the rinse fluid comprises water.

13. The method of claim 8 wherein the flush gas comprises nitrogen and wherein the flush gas is provided by a surge drum.

14. The method of claim 13 wherein the step of recycling the flush gas comprises a step of collecting the flush gas in a low pressure tank, compressing at least part of the flush gas from the low pressure tank, and storing the compressed flush gas in a surge drum.

* * * * *